United States Patent [19]

Saint-Amand

[11] 4,203,704

[45] May 20, 1980

[54] ELECTRIC FAN AND ESPECIALLY A FAN OF THE FLAT TYPE

[75] Inventor: Henri Saint-Amand, Antony, France

[73] Assignee: Etudes Techniques et Representations Industrielles E.T.R.I., Neuilly-sur-Seine, France

[21] Appl. No.: 839,287

[22] Filed: Oct. 3, 1977

[30] Foreign Application Priority Data

Nov. 23, 1976 [FR] France ............... 76 35220

[51] Int. Cl.² .................................... F04D 25/08
[52] U.S. Cl. .................... 416/93 R; 416/95; 417/353
[58] Field of Search .............. 416/95, 93R; 417/353, 417/354

[56] References Cited

U.S. PATENT DOCUMENTS

| 2,521,638 | 9/1946 | Lamm | 417/353 |
| 2,742,223 | 4/1956 | Font | 417/354 |
| 3,276,678 | 10/1966 | Saretzky | 417/353 |
| 3,303,995 | 2/1967 | Boeckel | 417/353 |
| 3,378,192 | 4/1968 | Friese | 417/353 |
| 3,561,891 | 2/1971 | Saint-Amand | 417/353 |
| 3,914,071 | 10/1975 | Friese | 417/353 |
| 3,961,864 | 6/1976 | Papst et al. | 417/354 |
| 4,128,364 | 12/1978 | Papst et al. | 416/93 R |

FOREIGN PATENT DOCUMENTS

| 478417 | 1/1938 | United Kingdom | 416/93 |
| 1439513 | 6/1976 | United Kingdom | 417/353 |

Primary Examiner—Everette A. Powell, Jr.
Assistant Examiner—A. N. Trausch, III
Attorney, Agent, or Firm—Young & Thompson

[57] ABSTRACT

The fan rotor has an axial passage for a stationary shaft, one end of which is secured to the housing. The other end is covered by a plug for sealing-off the axial passage near the impeller hub. An external cover-plate of heat-conducting material is placed over the plug and applied in good thermal contact with the annular end portion of the rotor which is associated with the impeller.

7 Claims, 7 Drawing Figures

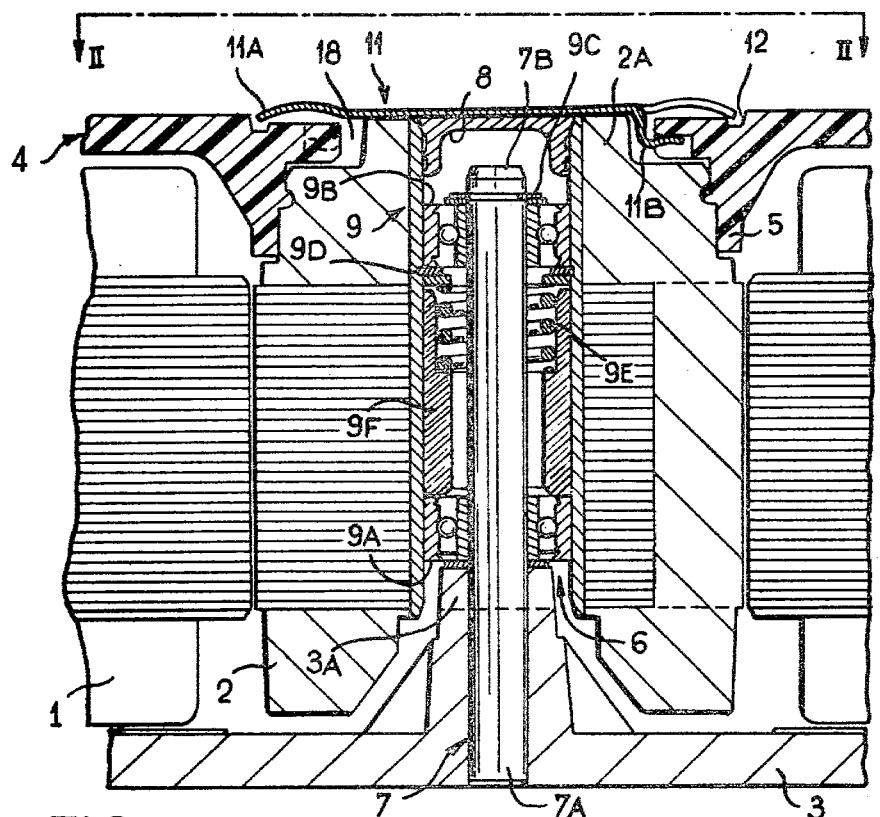
FIG_1
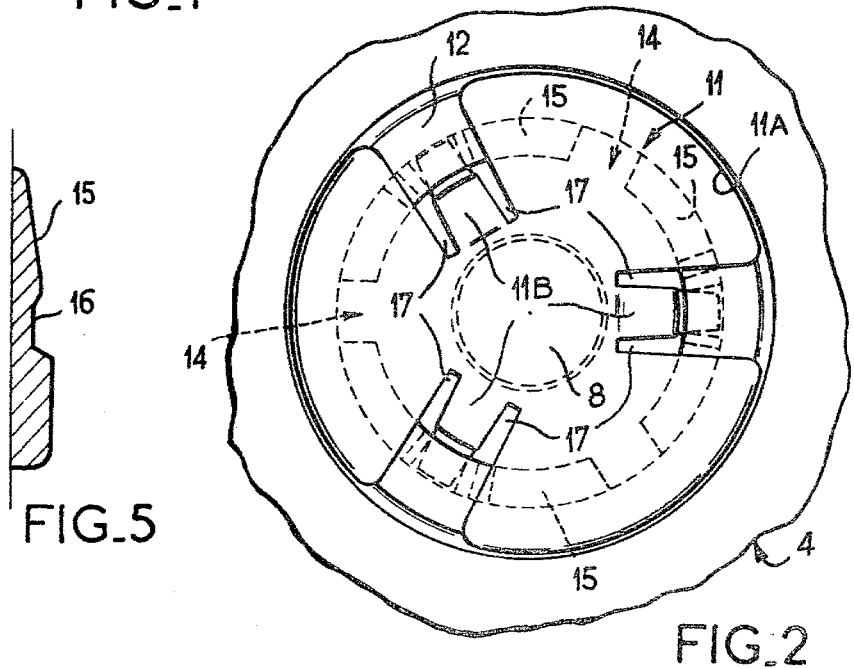
FIG_5
FIG_2

ELECTRIC FAN AND ESPECIALLY A FAN OF THE FLAT TYPE

This invention relates to an electric fan and in particular to a fan of the flat type comprising a stator and rotor mounted within a housing, especially a housing which forms a box unit to be flush-mounted in a wall. Fans of this class are primarily employed for the purpose of cooling various types of electronic equipment in which design specifications call for an overall axial length of very small value of the order of 25 mm, for example. This entails the need for a very special mode of construction in which calculations must ensure that the dimensions of each component are kept to a strict minimum.

It is known that a fan of the above-mentioned type is constituted by an impeller and hub provided with a socket which is adapted to fit over an annular end portion of the rotor. The rotor has an axial passage for mounting a dead spindle or stationary shaft which is attached to the housing at one end. The other end of the shaft is covered with a plug which seals-off the axial passage of the rotor on the side nearest the impeller. The plug serves to maintain internal cleanliness of the axial rotor passage and bearings. By way of example, either ball-bearings or plain bearings are employed and are mounted within the axial passage just mentioned in such a manner as to ensure that the rotor is rotatably associated with the stationary shaft. The plug also serves to retain the lubricant in the bearings and thus to ensure that these latter have a long life.

It is endeavoured as far as possible to increase the endurance and reliability of the fans under consideration by reducing vibrations and noise of mechanical origin. Equipment of this type is often employed for cooling delicate and very costly installations and it is therefore a further objective to provide users with a guarantee of very long service life. In particular, it is usually sought to obtain guaranteed continuous operation of such fans over a period of several tens of thousands of hours without any interruption or maintenance.

In order to improve the long-term endurance of a bearing, it is generally known that its operating temperature must be kept as low as possible in order to reduce the wear of parts in contact while at the same time preventing excessive fluidity of the lubricant in which losses by evaporation or centrifugal action are thus reduced to a substantial degree.

The bearings of electrical fans of the type considered in the foregoing are continuously subjected to internal heating by the electric and magnetic circuits of the stator and rotor in addition to heating caused by frictional contact of the rotating portions of these latter. Internal cooling of these fans, whether of the natural or forced-draught type, is very difficult by reason of the stringent requirements of small overall size which are imposed on them. Taking these cooling difficulties into account, a fan-bearing operating temperature of the order of 40° or 50° C. above room temperature often has to be accepted. This operating temperature is thus often in the vicinity of 80° C. and even higher.

Under the conditions of operating temperature which have just been indicated in the case of bearings of known fans, it is difficult to make them conform to the high standards of ruggedness and reliability required by users. This difficulty is particularly marked in the case of plain bearings which are relatively more delicate than the best ball-bearings but are advantageous in practice on account of their low level of noise and vibrations.

The aim of the invention is to produce a fan of the above-mentioned type which is provided with better means for cooling the bearings with a view to achieving appreciably greater endurance and reliability of these latter over long periods of service.

The invention is directed to an electric fan and especially a fan of the flat type comprising a stator and rotor mounted within a housing, and an impeller having a hub provided with a socket which is adapted to fit over an annular end portion of the rotor. Said rotor has an axial passage for a stationary shaft which is secured to the housing at one end. The other end of the shaft is covered by a plug which seals-off the axial passage of the rotor on the side nearest the impeller hub. An external cover-plate is in turn fitted over the plug.

In accordance with the invention, the aforesaid fan is distinguished by the fact that the external cover-plate which is placed over the plug also covers the annular end portion of the rotor which is associated with the impeller. The cover-plate is made of material having good thermal conductivity. Fastening means are provided for applying the cover-plate in the service position against the annular end portion of the rotor in good thermal contact with said end portion.

The rotor is usually made of metal having good thermal conductivity such as an aluminum alloy. Favorable cooling of the rotor is thus achieved by virtue of the fact that the annular end portion of this latter is in good thermal contact with the cover-plate. Intense agitation of the surrounding air on the outer face of the impeller also has a beneficial cooling action on said cover-plate. Cooling of the rotor permits a substantial reduction of the operating temperature of the bearings which are mounted in the axial passage. The result thereby achieved is an appreciable increase of 50%, for example, in the useful life and reliability of the bearings compared with bearings of known fans.

The external impeller-hub fan which is remote from the mounting socket is advantageously provided with a recess for receiving a rim of the cover-plate in the service position and for centering this latter. Accurate mounting of the cover-plate is thus facilitated while avoiding any projecting portions on the external face of the impeller.

Preferably, the cover-plate is formed of sheet material and has at least two resilient radial tongues which project beneath the internal face of the cover-plate. The resilient tongues aforesaid can be engaged in the service position within locking recesses formed in the impeller hub for the removable mounting of the cover-plate on the hub. Preferably also, the cover-plate is substantially circular; the resilient tongues of said cover-plate can be rotatably engaged in the locking recesses of the hub.

As will be explained hereinafter, these arrangements permit of effective and convenient industrial manufacture of the fan in accordance with the invention.

The invention provides an advantageous mode of construction for a fan having an axial rotor passage fitted with a mounting tube for at leat one plain bearing which is rotatably mounted on the shaft and retained axially at the outer end by means of a resilient washer, said washer being fixed at that end of the shaft which is covered by the plug. In the position of service of the fan aforesaid, the plug is applied against the cover-plate which defines a precise position of said plug with respect to the rotor. On the side remote from the cover-plate, the plug is fitted with a thrust-bearing member for a domical projection of the shaft-end.

This arrangement permits of convenient adjustment of the very small axial clearance which it is desirable to provide for the rotor between the point of application of the plain bearing against the resilient washer which is fixed on the shaft-end and the point of application of the thrust-bearing member of the plug against the domical projection of the shaft-end. Depending on the speed of rotation of the impeller and the angle of slope of the fan, this latter can accordingly operate with all the smoothness that is required while the fan rotor is applied axially against either of the two abutment means mentioned in the foregoing.

Further distinctive features and advantages of the invention will become apparent from the following description of two embodiments of the invention which are given hereinafter by way of example and not in any limiting sense, reference being made to the accompanying drawings, wherein:

FIG. 1 is an axial sectional view of the central portion of a fan in accordance with the invention;

FIG. 2 is an overhead plan view of the plug of the fan shown in FIG. 1, this view being taken along line II—II;

FIG. 5 is a diagram of the developed profile of the guide ramp of one of the recesses formed in the hub of FIG. 4 for each of the radial tongues of the cover-plate of FIG. 3;

Figure 6:
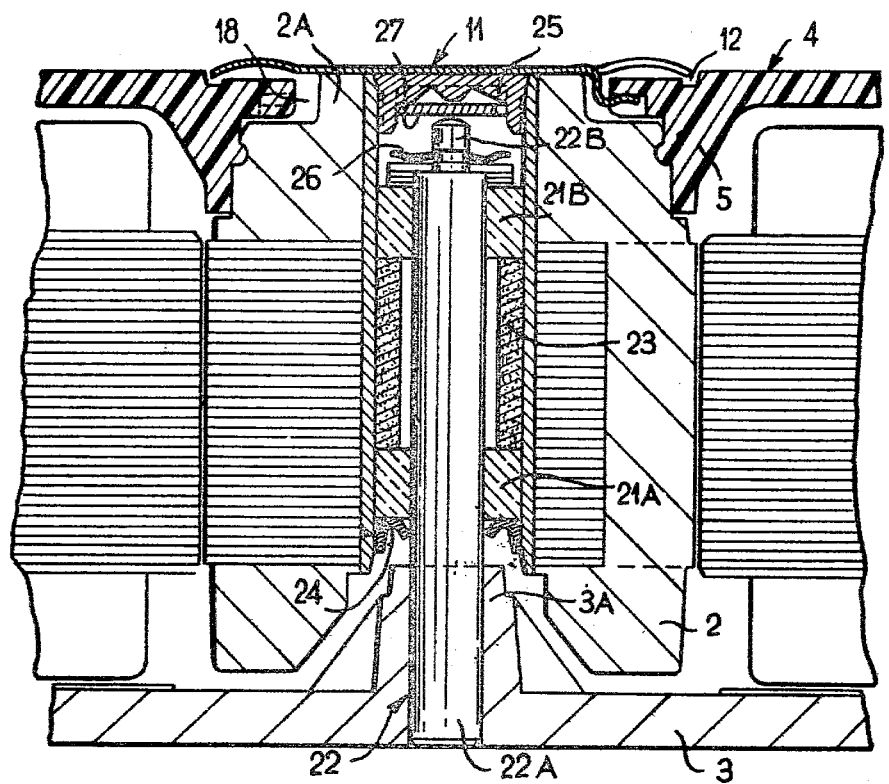
Figure 7:
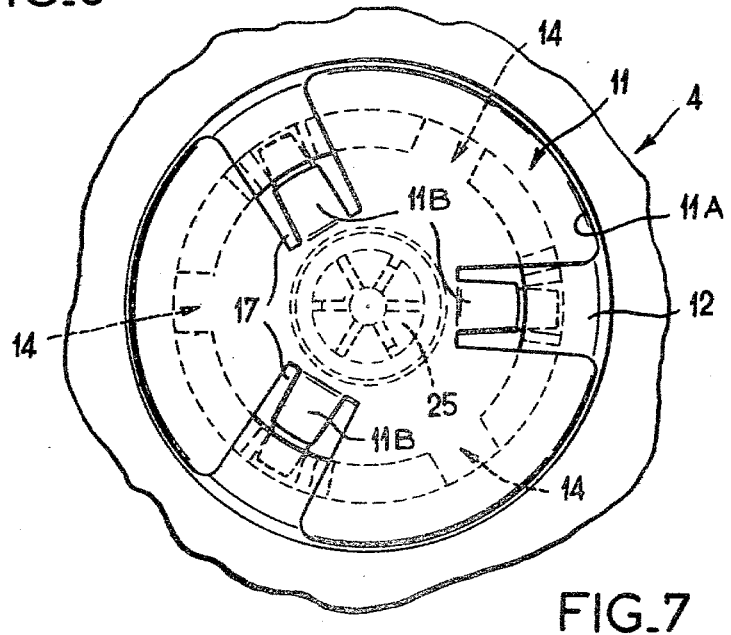

FIGS. 6 and 7 which are similar to FIGS. 1 and 2 are respectively an axial sectional view of the central portion of an alternative embodiment of the fan in accordance with the invention and a plan view of the removable cover-plate of said fan.

In the embodiment of FIGS. 1 to 4, the electric fan comprises a stator 1 and a rotor 2 which are mounted within a housing 3. By way of example, said housing can constitute a flat box unit which is intended to be flush-mounted in a wall of an electronic equipment cubicle. The fan comprises an impeller and impeller hub 4 having a socket 5 which is adapted to fit over an annular end portion 2A of the rotor. Said rotor has an axial passage 6 for a stationary shaft 7 which is secured to the housing 3 at one of its ends 7A. The other end 7B of the shaft is covered by a plug 8 which seals off the axial passage 6 of the rotor 2 at the end nearest the impeller hub 4. An external cover-plate 11 is fitted over the plug 8.

In accordance with the invention, the external cover-plate 11 which is placed over the plug 8 also covers the annular end portion 2A of the rotor which is associated with the impeller hub 4. The cover-plate 11 is made of material having good thermal conductivity such as, for example, sheet metal cut-out by die-stamping. Fastening means are provided for applying the cover-plate in the service position (as shown in FIG. 1) against the annular end portion 2A of the rotor in good thermal contact with said end portion.

As a preferable feature (shown in FIG. 1), the passage 6 is defined by a calibrated tube 9 which is rigidly fixed to the rotor 2 and serves to mount the rotor bearings. By way of example, these bearings are constituted by two ball-bearings 9A, 9B, the outer and inner rings of which are engaged respectively in the tube 9 and on the shaft 7.

The inner ring of the bearing 9A is applied against a boss 3A of the housing 3 in which the shaft 7 is fixed. At the other end, the inner ring of the bearing 9B is retained by a resilient washer 9C which is mounted at the end 7B of the shaft 7 opposite to the plug 8.

Opposite to the resilient washer 9C, the outer ring of the bearing 9B is retained axially by a stop-ring 9D which is mounted within a groove of the tube 9. A helical spring 9E which surrounds the shaft 7 is mounted in compression between the stop-ring 9D and a tubular distance-piece 9F which is mounted within the tube 9 with slight friction. One end of the distance-piece 9F is associated with the inner ring of the bearing 9A in order to maintain said inner ring resiliently applied against the boss 3A of the housing by means of balls.

Figure 3:
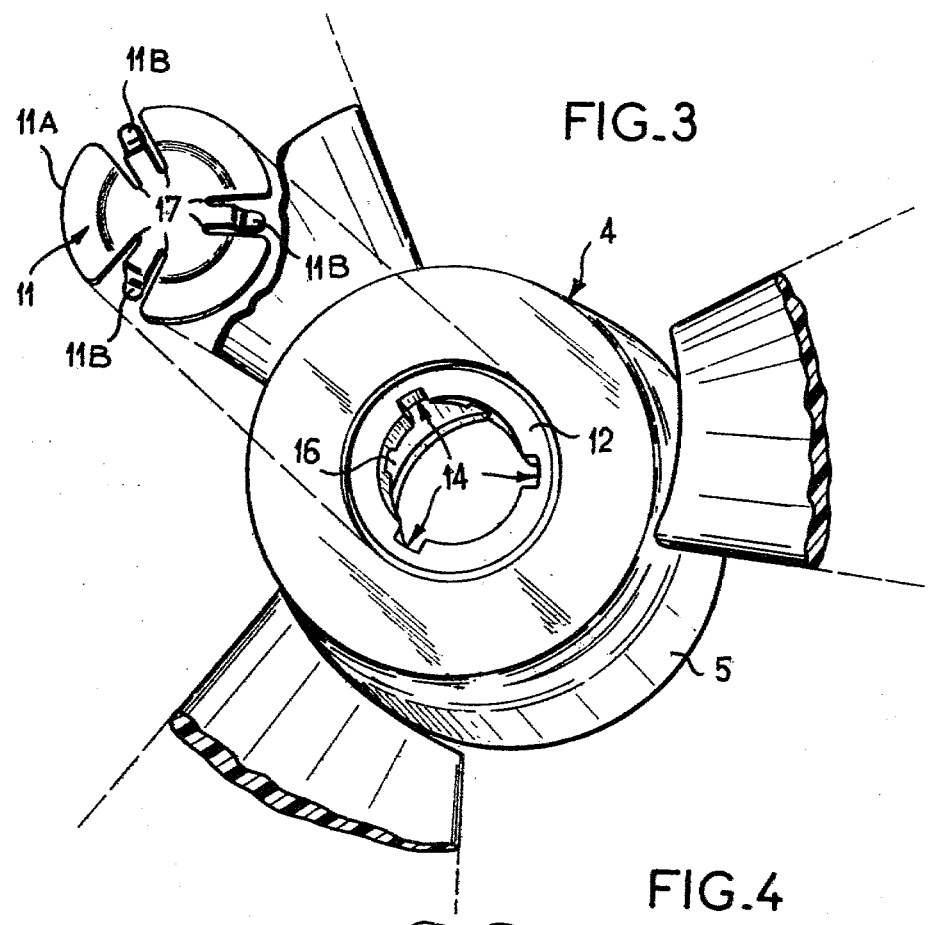
FIG. 3 is an exploded view in perspective showing the impeller hub and the cover-plate of the hub of the same fan, looking on the outer face of the hub.

Preferably (as shown in FIGS. 1 and 3), the external face of the hub 4 which is remote from the socket 5 for mounting the impeller on the rotor 2 is provided with a recess 12 for receiving a rim 11A of the cover-plate in the service position and for centering the latter. As shown by way of example in FIGS. 2 and 3, the cover-plate 11 is advantageously of circular shape and provided with at least two resilient radial tongues 11B forming projections beneath the internal face of the cover-plate. The resilient tongues 11B which are three in number, for example, can be engaged by rotation within locking recesses 14 formed in the impeller hub 4 so as to permit removable mounting of the cover-plate 11 on said hub.

Figure 4:
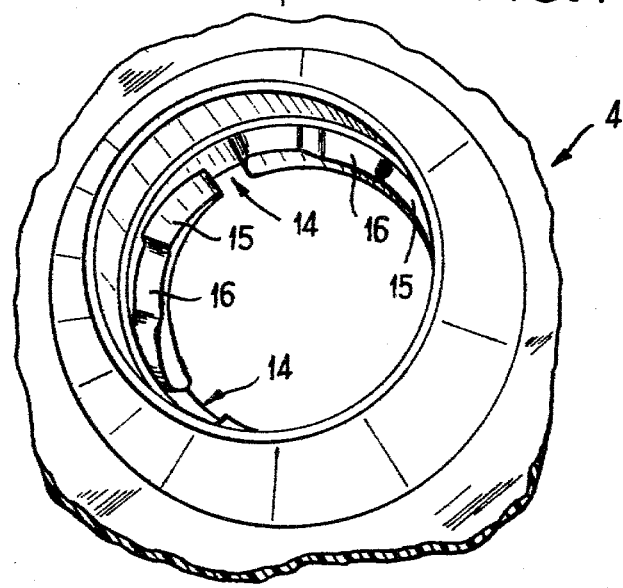
FIG. 4 is a view in perspective showing the central portion of the impeller hub of FIG. 3, looking on the internal face of the hub.

As illustrated in FIGS. 2, 3 and 4, at least one of the recesses 14 has an engagment ramp 15 provided with a retaining notch 16. One end of a radial resilient tongue 11B which is associated with the cover-plate 11 can be engaged in said retaining notch 16 in a stable manner. By virtue of the mode of assembly shown in FIG. 1, the cover-plate 11 can be securely fixed on the fan impeller hub 4 in a simple and rapid manner. Furthermore, the cover-plate 11 can be applied against the annular end portion 2A of the rotor 2 in good thermal contact with said end portion. To this end, those parts of the cover-plate 11 and of the annular end portion 2A which are in contact with each other can be carefully machined and polished in order to improve the effect of thermal conduction of the cover-plate 11 which is applied against the annular end portion 2A of the rotor by virtue of the elasticity of the radial tongues 11B.

Preferably, the cover-plate 11 is provided with slots 17 which open into a space 18 located underneath said cover-plate in the vicinity of the annular end portion 2A of the rotor in order to achieve improved cooling of the space 18 by ventilation as will be explained below. By way of example, the slots 17 are formed on each side of each radial tongue 11B.

The following description will now explain the assembly and operation of the fan in accordance with the invention as described in the foregoing with reference to FIGS. 1 to 5 as well as the advantages offered by the invention.

Before proceeding to the final assembly of the fan which consists in mounting the rotor 2 on the shaft 7 of the housing 3, the stator 1 has previously been installed within the housing; the calibrated tube 9 has also been engaged within the rotor passage 6; and the impeller hub 4 has been fixed on the rotor. By way of example, said rotor 2 is of aluminum alloy. The hub 4 is of plastic material which is deformable in the hot state and can be mounted by ultrasonic crimping on the end portion 2A of the rotor which is accordingly provided with an annular retaining groove (as shown in FIG. 1).

The inner stop-ring 9D is then mounted in the corresponding groove of the calibrated tube 9, the ball-bearing 9B being inserted in said tube on one side of the ring 9D and the assembly constituted by the spring 9E, the tubular distance-piece 9F and the ball-bearing 9A being inserted on the other side. The tube as thus equipped is then fitted over the shaft 7 until the inner ring of the ball-bearing 9A is applied against the boss 3A. The resilient stop-washer 9C can be fitted in position by pressing lightly on the ball-bearing 9B, thus fixing the rotor 2 on the shaft 7 in a precise axial position defined by the inner stop-ring 9D.

The ball-bearings 9A, 9B which have previously been lubricated are protected by the seal plug 8 which is fitted within the tube 9 in proximity to the impeller hub 4. Furthermore, the plug 8 serves to retain any possible projections of lubricant.

As shown in FIG. 3, the cover-plate 11 is positioned by introducing the resilient radial tongues 11B in the corresponding receses 14 formed in the impeller hub 4. By rotating the circular cover-plate 11 which is centered in the hub recess 12, each resilient tongue 11B is engaged on a ramp 15 (as shown in FIG. 4) until the tongue is secured by elasticity within the retaining notch 16, thus ensuring stable fastening of the cover-plate 11 on the hub 4.

The machined and polished face of the annular end portion 2A of the rotor is in intimate contact with the associated internal face of the cover-plate 11, said internal face being also polished. This has the effect of ensuring in the outward direction good thermal conductivity of the annular end portion 2A of the rotor 2 which is formed of metal having good heat conductivity such as an aluminum alloy.

When the fan is in operation over a long period of time, internal heating of the electric and magnetic circuits of the stator 1 and of the rotor 2 is added to the heating produced by the ball-bearings 9A, 9B. The temperature of these bearings thus tends to rise within the tube 9 at the center of the rotor 2. However, active agitation of the air which circulates on the external face of the cover-plate 11 ensures effective cooling of the rotor 2 at the end portion 2A which is in intimate thermal contact with the cover-plate. The aforesaid cooling process is improved by means of slots 17 (shown in FIG. 2) which ensure ventilation of the space 18 beneath the cover-plate 11 in the vicinity of the annular end portion 2A of the rotor. The slots 17 are preferably formed on each side of each radial tongue 11B of the cover-plate.

Efficient cooling of the rotor 2 is thus ensured by the invention and makes it possible to achieve an appreciable reduction in the operating temperature of the ball-bearings 9A and 9B of the rotor, for example to 10° or 15° C. below the usual operating temperature of ball-bearings of known fans. This accordingly ensures a considerable increase in the useful life and reliability of the ball-bearings and the fan in a proportion of 50%, for example.

As can readily be understood, the invention is not limited to the form of construction which has just been described by way of example and a number of different alternative forms can accordingly be devised without thereby departing from the scope of the invention.

In FIGS. 6 and 7 which are similar to FIGS. 1 and 2, there has been shown another embodiment of the invention in which the inner tube 9 of the rotor 2 is adapted to receive with strong friction two plain bearings 21A, 21B of sintered copper alloy, for example, said bearings being rotatably mounted on a shaft 22 and separated by an absorbent tubular packing 23 which constitutes a reserve supply of lubricant. At the end corresponding to the boss 3A which serves to fix the shaft 7 on the housing 3, leak-tightness of the rotor bearings is ensured by means of a thin-lipped annular seal 24 of plastic material, for example. At the other end and in the proximity of the impeller hub 4, leak-tightness of the bearings is ensured by means of a plug 25 which is similar to the plug 8 of FIG. 1.

The bearing 21B is retained axially at the outer end by means of a resilient washer 26 which is mounted at the end 22B of the shaft 22 adjacent the plug 25. In the service position, the plug 25 is accordingly applied against the internal face of the cover-plate 11 as already described with reference to FIGS. 1, 2 and 3. The cover-plate 11 thus defines with respect to the rotor 2 a precise axial position of the plug 25 which is fitted on the side remote from the cover-plate 11 with a thrust-bearing member 27 for a domical projection of the end 22B of the shaft 22. The thrust-bearing member 27 is constituted for example by a pastille of bronze or of hard self-lubricating plastic material such as a fluorinated resin.

The very small axial clearance of the rotor 2 having a value of the order of one or two tenths of a millimeter, for example, can thus be readily and accurately adjusted between the point of application of the thrust-bearing member 27 of the plug 25 against the domical projection of the shaft-end 22B and the point of application of the plain bearing 21B against the resilient stop-washer 26. The fan can thus operate with the full degree of smoothness which is necessary while its rotor 2 is applied axially either in one direction or in the other against one of the above-mentioned abutment means, depending on the speed of rotation of the impeller and on the angle of slope of its axis of rotation.

As has already been explained in connection with FIGS. 1 to 3, the cover-plate 11 also ensures efficient cooling of the plain bearings 21A, 21B and makes it possible to reduce the operating temperature of said bearings to an appreciable extent while at the same time achieving enhanced endurance and reliability of the fan.

A variety of complementary cooling means can clearly be associated with the cover-plate 11. In spite of the small dimensions of flat fans which are presented by way of example, it has thus been possible to provide radial slots (as shown in FIGS. 2, 3, 7) in order to improve the ventilation of the internal face of the cover-plate 11.

In the case of fans of relatively large size, the complementary means for cooling the cover-plate and the rotor can readily be improved in a number of different ways. For example, the thermal conduction between the end portion 2A of the rotor and the cover-plate 11 can be increased by bearing on a large common surface with powerful clamping carried out by means of axial screws for fastening the cover-plate on the end of the rotor.

It is also possible to improve the thermal radiation of the cover-plate 11 by endowing this latter with a larger radiation surface, for example by means of fins adapted to the flow of the airstream which is sucked-in or discharged by the fan. A number of different methods for flow visualization and measurement of temperatures make it possible to carry out an experimental study on the arrangement and profile of the aforesaid fins as well as to check their efficiency. A surface treatment of the cover-plate and of its fins is also favorable for this purpose.

By profiling the fins for cooling the cover-plate and by associating them if necessary with orifices having profiled lips, it is also possible to promote the localized ventilation of both faces of the cover-plate and to increase the convection effect which is conducive to the desired cooling action.

I claim:

1. An electric fan and especially a fan of the flat type comprising a stator and a rotor forming a motor mounted within a housing, an impeller having a hub with a socket which fits over an annular end portion of the rotor, an axial passage within said rotor and a stationary shaft in said passage, one end of said shaft being secured to the housing and the other end being covered by a plug for sealing-off the axial passage of the rotor at the end nearest the impeller hub, an external cover-plate covering said plug and the annular end portion of the rotor which is associated with the impeller, said cover-plate having slots which open into a space located underneath said cover-plate in the vicinity of the annular end portion of the rotor in order to improve the cooling of said end portion by ventilation, said space being out of communication with the internal part of the motor, and elastic means applying said cover-plate against said end portion of the rotor in good thermal contact with said end portion, said cover-plate being of highly heat conductive material.

2. A fan according to claim 1, wherein the external impeller-hub face which is remote from the socket for mounting the impeller is provided with a recess for receiving a rim of the cover-plate in the service position and for centering said cover-plate.

3. A fan according to claim 1, wherein the cover-plate is formed of sheet metal and has at least two resilient radial tongues which project beneath the internal face of the cover-plate, the resilient tongues aforesaid being such as to permit of engagement in the service position within locking recesses formed in the impeller hub for the removable mounting of said cover-plate on said hub.

4. A fan according to claim 3, wherein the cover-plate is substantially circular and the resilient tongues of the cover-plate can be rotatably engaged within the locking recesses for securing said cover-plate to the impeller hub.

5. A fan according to claim 4, wherein at least one locking recess has a ramp provided with a retaining notch in which the radial tongue associated with the cover-plate in the service position can be engaged in a stable manner.

6. A fan according to claim 3, wherein the slots aforesaid are formed on each side of each radial tongue of the cover-plate.

7. A fan according to claim 1, in which said slots are of substantial width.

* * * * *